C. R. ADAMS.
LUBRICATING DEVICE.
APPLICATION FILED APR. 22, 1912.

1,032,724.

Patented July 16, 1912.

Witnesses:

Inventor
Conrad R. Adams
Wilhelm, Parker & Hard,
Attorneys.

UNITED STATES PATENT OFFICE.

CONRAD R. ADAMS, OF BUFFALO, NEW YORK, ASSIGNOR TO THE PIERCE-ARROW MOTOR CAR COMPANY, OF BUFFALO, NEW YORK.

LUBRICATING DEVICE.

1,032,724.  Specification of Letters Patent.  Patented July 16, 1912.

Application filed April 22, 1912. Serial No. 692,375.

*To all whom it may concern:*

Be it known that I, CONRAD R. ADAMS, a citizen of the United States, residing at Buffalo, in the county of Erie and State of New York, have invented a new and useful Improvement in Lubricating Devices, of which the following is a specification.

This invention relates to lubricating devices, and while the device is more especially designed for lubricating the worm shaft bearings of worm gearings, such, for instance as employed in motor vehicles, in which the worm is located above the worm wheel, nevertheless the device is not necessarily restricted in application to gearings of this type. Gearings of this sort are ordinarily housed in a gear case containing oil, in which one of the gears runs. In worm gearings in which the worm is located above the worm wheel, the latter runs in the oil in the bottom of the gear case and lubricates itself and the worm and also the worm wheel bearings, but the worm and worm wheel have a tendency to throw or drive the oil away from the bearings at one end of the worm so that the bearings at this end of the worm are apt to be insufficiently lubricated.

The object of the invention is to provide an efficient lubricating device of simple, inexpensive and durable construction which will insure the thorough lubrication of the bearings for the rotary shaft or spindle to which it is applied.

Figure 1:
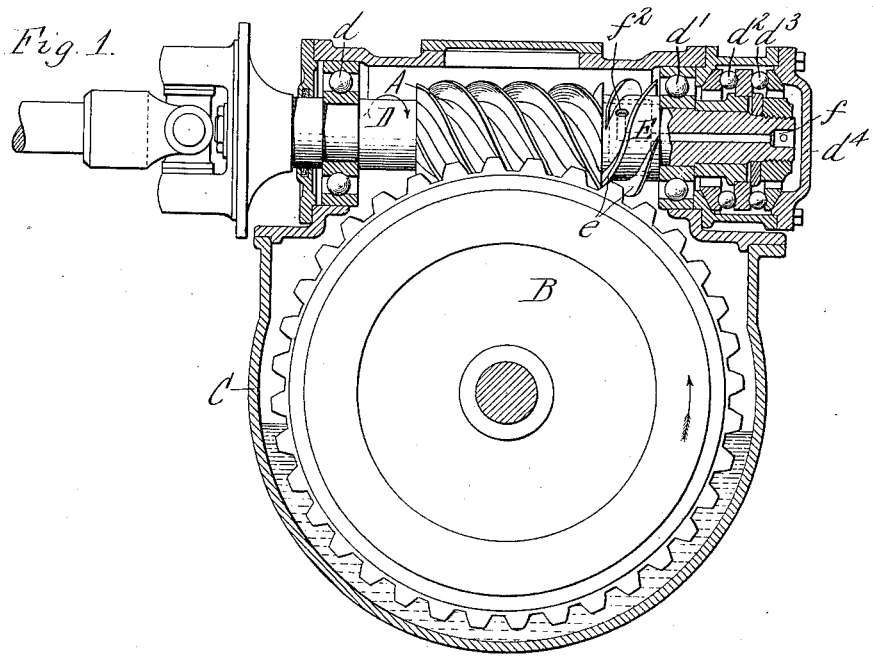
Figure 2:
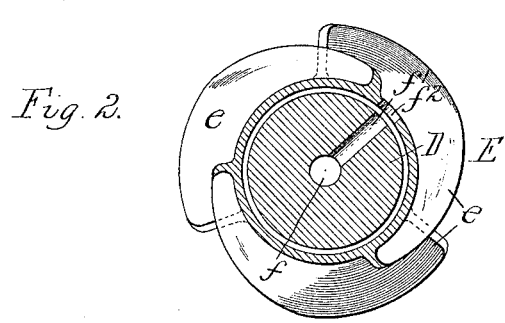

In the accompanying drawing: Figure 1 is a sectional elevation of a worm gearing provided with a lubricating device embodying the invention. Fig. 2 is a transverse sectional elevation, on an enlarged scale, of the lubricating device.

Like reference characters refer to like parts in the several figures.

In the construction shown in the drawings, which is an inclosed worm gearing suitable for the drive gearing of automobiles, A represents the worm which is arranged above the worm wheel B and is normally driven in the direction indicated by the arrow in Fig. 1 for driving the worm wheel. The gear case C may be of any suitable construction and the gears may be journaled in any suitable way therein. Preferably the worm spindle or shaft D is supported at opposite ends in ball bearings $d\ d'$ and is provided at one end with ball thrust bearings $d^2\ d^3$ inclosed by a part $d^4$ of the case which is removable to afford access to the bearings. The worm wheel runs in oil in the bottom of the gear case and carries the oil up to the worm.

E represents the lubricating device, which is secured on the worm spindle between the bearing $d'$ and the adjacent end of the worm and consists of a propeller provided with one or more, preferably three, helical ribs or blades $e$. These blades extend in a direction opposite to the direction of the threads of the worm, so that when the worm is rotating in the normal direction indicated, the oil thrown up by the worm wheel is picked up by the blades of the oil propeller and thrown outwardly against the ball bearing $d'$. Passing through the bearing, the oil finds its way through the adjacent thrust bearings $d^2\ d^3$ to the outer end of the bearing case $d^4$. The worm spindle is provided with an open-ended longitudinal oil passage $f$ which has a radial or outwardly extending portion $f'$ connecting with a hole $f^2$ through the body of the oil propeller. Centrifugal force, due to the rotation of the worm, causes a slight vacuum in the oil passage $f$, which draws the oil through the passage from the outer end of the bearing case, and this, supplemented by the propelling action of the oil propeller E, maintains a circulation of the oil through the bearing $d'$ and thrust bearings $d^2\ d^3$, thus insuring a thorough and efficient lubrication of these bearings. The worm wheel normally rotates in a direction to splash the oil against the other bearing $d$ for the worm, and this coupled with the tendency of the worm to feed the oil in the same direction insures a sufficient lubrication of this bearing $d$.

I claim as my invention:

1. The combination with a case containing oil, a rotary member which is located in said case above the oil and has a bearing at one end, and means for lifting the oil to said rotary member, of an oil propeller on said rotary member provided with a helical blade arranged to move the oil toward said bearing, substantially as set forth.

2. The combination with a gear case containing oil, a gear in said case which runs in the oil, an upper gear meshing with said first gear, and a bearing for said upper gear, of a rotary oil propeller arranged between said upper gear and said bearing and provided with a helical blade arranged to move the oil toward said bearing, substantially as set forth.

3. The combination with a gear case containing oil, a worm wheel in said case which runs in the oil, a worm above said worm wheel, and a bearing for the worm spindle, of a rotary oil propeller arranged between said worm and said bearing and provided with a blade having an inclination opposite to that of the threads of the worm for moving the oil toward said bearing, substantially as set forth.

4. The combination with a case containing oil, a rotary member which is located in said case above the oil and has a bearing at one end, and means for lifting the oil to said rotary member, of an oil propeller on said rotary member provided with a helical blade arranged to move the oil toward said bearing, said rotary member having a longitudinal oil passage extending from side to side of said bearing and provided with an outwardly directed portion whereby the oil is caused to circulate through said bearing and passage, substantially as set forth.

5. The combination with a gear case containing oil, a worm wheel in said case which runs in the oil, a worm above said worm wheel, and a bearing for the worm spindle, of a rotary oil propeller arranged between said worm and said bearing and provided with a blade having an inclination opposite to that of the threads of the worm for moving the oil toward said bearing, said worm spindle having a longitudinal passage extending from said oil propeller to the far side of said bearing and provided with an outwardly directed portion adjacent to the propeller whereby the oil is caused to circulate through said bearing and passage, substantially as set forth.

Witness my hand, this 16 day of April, 1912.

C. R. ADAMS.

Witnesses:
  H. KERR THOMAS,
  EDNA FORBUSH.